United States Patent
Martinez Canedo et al.

(10) Patent No.: US 9,110,653 B2
(45) Date of Patent: Aug. 18, 2015

(54) GENERATING PLC CODE FROM CAD MODELS

(75) Inventors: Arquimedes Martinez Canedo, Princeton, NJ (US); Lingyun Lu, Diamond Bar, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 441 days.

(21) Appl. No.: 13/364,368

(22) Filed: Feb. 2, 2012

(65) Prior Publication Data

US 2013/0055196 A1  Feb. 28, 2013

Related U.S. Application Data

(60) Provisional application No. 61/527,746, filed on Aug. 26, 2011.

(51) Int. Cl.
*G06F 9/46* (2006.01)
*G05B 19/05* (2006.01)
*G06F 9/44* (2006.01)
*G05B 17/00* (2006.01)

(52) U.S. Cl.
CPC *G06F 8/30* (2013.01); *G05B 17/00* (2013.01); *G05B 19/052* (2013.01); *G05B 2219/34333* (2013.01)

(58) Field of Classification Search
None
See application file for complete search history.

(56) References Cited

U.S. PATENT DOCUMENTS

| | | | |
|---|---|---|---|
| 7,185,309 B1 * | 2/2007 | Kulkarni et al. | 716/104 |
| 2001/0013511 A1 * | 8/2001 | Hong | 219/124.34 |
| 2003/0204560 A1 * | 10/2003 | Chen et al. | 709/203 |
| 2004/0073404 A1 * | 4/2004 | Brooks et al. | 702/183 |
| 2008/0125883 A1 * | 5/2008 | Gould et al. | 700/51 |
| 2010/0063792 A1 * | 3/2010 | Noetzelmann et al. | 703/13 |

OTHER PUBLICATIONS

Sinha, Rajarishi, Christiaan JJ Paredis, and Pradeep K. Khosla. "Integration of mechanical CAD and behavioral modeling." Behavioral Modeling and Simulation, 2000. Proceedings. 2000 IEEE/ACM International Workshop on. IEEE, 2000.*

* cited by examiner

*Primary Examiner* — Li B Zhen
*Assistant Examiner* — Joanne Macasiano

(57) ABSTRACT

Product data management systems, methods, and mediums. A method includes receiving a functional model, and identifying a plurality of elements of the functional model. Each element corresponds to one or more machine operations. The method includes identifying concurrencies between elements to determine at least one set of elements. The method includes creating an execution thread for each of the sets of elements. The method can include generating a rule-based programmable logic controller (PLC) program corresponding to the functional model, based on the execution threads.

20 Claims, 14 Drawing Sheets

| # | NAME | CLASS | TYPE | LOCATION | INITIAL VALUE |
|---|---|---|---|---|---|
| 1 | LeverDown_Position | INPUT | REAL | | 45.0 |
| 2 | LeverDown_CurrPosition | INPUT | REAL | | 0.0 |
| 3 | LeverDown_Speed | OUTPUT | REAL | | 0 |
| 4 | LeverDown_Done | LOCAL | BOOL | | FALSE |
| 5 | ConveyerOn_ParallelSpeed | OUTPUT | REAL | | 0 |
| 6 | ConveyerOn_Done | LOCAL | BOOL | | FALSE |
| 7 | Gripper1_Speed | OUTPUT | REAL | | 0 |
| 8 | Gripper1_Position | INPUT | REAL | | -30.0 |
| 9 | Gripper1_CurrPosition | INPUT | REAL | | 0.0 |
| 10 | Gripper1_TileDetection_Triggered | INPUT | BOOL | | FALSE |
| 11 | Gripper1_Done | LOCAL | BOOL | | FALSE |
| 12 | Gripper2_Speed | OUTPUT | REAL | | 0 |
| 13 | Gripper2_Position | INPUT | REAL | | -30.0 |
| 14 | Gripper2_Currposition | INPUT | REAL | | 0.0 |
| 15 | Gripper2_TileDetection_Triggered | INPUT | BOOL | | FALSE |
| 16 | Gripper2_Done | LOCAL | BOOL | | FALSE |
| 17 | Grip_Done | LOCAL | BOOL | | FALSE |
| 18 | TurnLever_Speed | OUTPUT | REAL | | 0 |
| 19 | TurnLever_Position | INPUT | REAL | | -120.0 |
| 20 | TurnLever_CurrPosition | INPUT | REAL | | 0.0 |
| 21 | TurnLever_Done | LOCAL | BOOL | | FALSE |
| 22 | ReleaseGripper_Done | LOCAL | BOOL | | FALSE |
| 23 | TurnBack_Speed | OUTPUT | REAL | | 0 |
| 24 | TurnBack_Position | INPUT | REAL | | 45.0 |
| 25 | TurnBack_CurrPosition | INPUT | REAL | | 0.0 |
| 26 | TurnBack_Done | LOCAL | BOOL | | FALSE |
| 27 | SequenceChartOn | LOCAL | BOOL | | FALSE |
| 28 | SequenceFinish_Done | LOCAL | BOOL | | FALSE |
| 29 | Gripper_Trigger_Attachment | OUTPUT | STRING | | |

FIG. 13

GENERATING PLC CODE FROM CAD MODELS

CROSS-REFERENCE TO RELATED APPLICATION

This application claims the benefit of the filing data of U.S. Provisional Patent Application 61/527,746, filed Aug. 26, 2011, which is hereby incorporated by reference.

TECHNICAL FIELD

The present disclosure is directed, in general, to computer-aided design, visualization, and manufacturing systems ("CAD systems"), product lifecycle management ("PLM") systems, project management systems, and systems that manage data for products and other items (individually and collectively, product data management ("PDM") systems).

BACKGROUND

PDM systems can aid users in creating and managing data objects, including mechatronics objects as used herein. Improved systems, that take advantage of mechatronics objects, are desirable.

SUMMARY OF THE DISCLOSURE

Various disclosed embodiments relate to systems and methods for automatic generation of PLC programs from functional PDM models, and in particular in PDM systems configured to perform processes as described herein.

Various embodiments include PDM systems, methods, and mediums. A method includes receiving a functional model, and identifying a plurality of elements of the functional model. Each element corresponds to one or more machine operations. The method includes identifying concurrencies between elements to determine at least one set of elements. The method includes creating an execution thread for each of the sets of elements. The method includes generating a programmable logic controller (PLC) program corresponding to the functional model, based on the execution threads.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 13 shows the resulting symbol table for an exemplary synthesized control program in accordance with disclosed embodiments.

DETAILED DESCRIPTION

Figure 1:
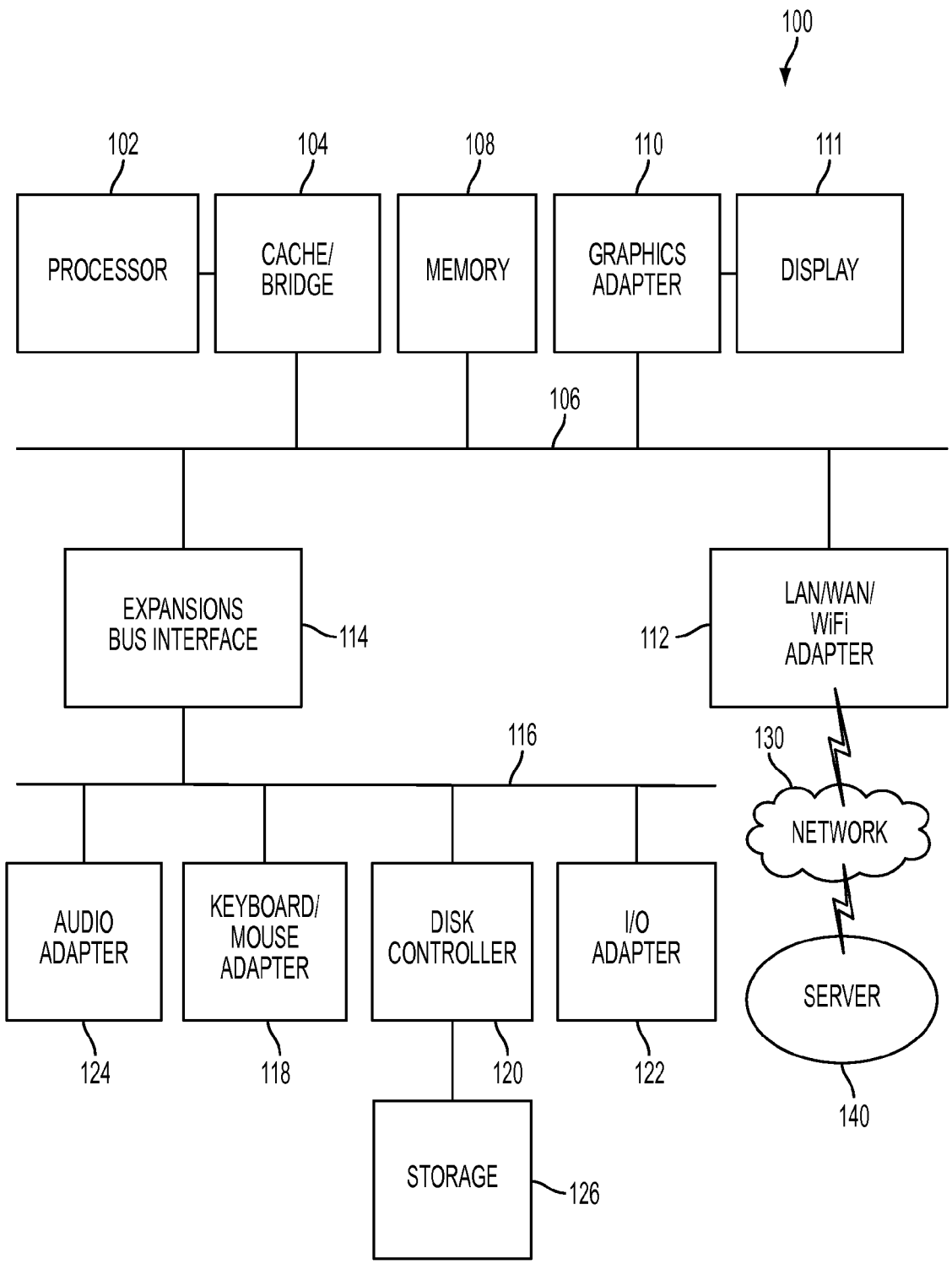
FIG. 1 depicts a block diagram of a data processing system in which an embodiment can be implemented in accordance with disclosed embodiments.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include systems and methods that synthesize programmable logic controller (PLC) code from functional PDM (CAD) models, that can include one or more mechatronic objects. To capture the behavior of mechatronic systems described in CAD, the various embodiments examine concurrency, synchronous behavior, and conditional execution. Moreover, the various embodiments determine the correct mathematical equations to calculate the states of the system, such as speed, position, etc., based on the information available in the CAD model and its functional properties such as rotational joint or transport surface. The synthesized code is complete, correct, and able to run in a PLC device. As used herein, the functional model refers to a model comprising one or more functional objects, and a specific example is a mechatronic model that includes one or more mechatronic objects.

PLCs are hard real-time systems that are used to control complex industrial systems such as production plants, energy grids, chemical processes, and robots. PLCs are complex computer systems that require expert programmers to develop the control code and the hardware configurations. Although generating PLC code automatically from another traditional computer programming language is possible, the synthesis of PLC code from a detailed mechatronic object is a challenging task. The main problem is gathering all the necessary information from the PDM object to infer the behavior and semantics of the mechatronic system and its control program.

Traditional PDM systems allow engineers to do detailed design of mechanical and electrical components including dimensions, materials, tolerances, and processes. The computer programming language of PDM systems is a 3D graphical language that is able to express complex shapes. Unfortunately, traditional 3D CAD systems cannot model behavior and the 3D CAD models are simply "static" representations of systems. Synthesizing control code from "static" 3D CAD models is impossible because of the absence of behavioral information about the system.

Modern 3D CAD systems such as the Mechatronics Concept Designer (MCD) produce developed by Siemens Product Lifecycle Management Software Inc. integrate behavioral modeling into the 3D CAD language as mechatronic objects. This gives the ability not only to simply describe "dynamic" models but to analyze behaviors through an interactive simulation of the system. This simulation shows different types of motion (linear, translational, rotational, etc), activation of sensors, etc. These "dynamic" 3D CAD models contain sufficient information to automatically synthesize control code because the behavior of the system has been modeled by the engineer. Because behaviors are actions, and actions express design intentions, we call these models functional 3D PDM models, or simply functional PDM objects.

This invention disclosure presents a method to synthesize PLC control code from functional PDM objects and models, such as a functional 3D CAD model of one or more mechatronic objects. In various embodiments, the system performs a rule-based code generation in that the compiler can determine what code should be generated based on the information obtained from the functional model, including physical characteristics and behaviors and the physical laws that should apply.

The ability to execute the synthesized code with an instance of the CAD model allows system designers to test detailed timing behavior of the actual control program when a real PLC is in-the-loop. Various embodiments include an interface between the synthesized code and the CAD modeling tool for co-simulation. The synthesized code is usable in a real industrial environment and is complete, correct, and able to run in a PLC device.

In general, mechatronics refers the synergistic combination of mechanical engineering, electrical/electronic engineering, computer engineering, control engineering, systems design engineering, and other technical disciplines to create, design and manufacture useful products. The concept phase in the overall design process of a mechatronics system is the first time where the architect thinks about the physical implementation. The architect must ensure that the implementation is conformant with the requirements and has a basic design structure that enables an efficient detailed design and production.

Some systems are capable of maintaining requirements, functions, and disciplinary data in a data base. One can match the various data structures by creating link between items in the data base from a pure data point of view. There is no specific design context for interdisciplinary concept design in conventional systems.

In conventional systems each item has a specific design context which makes the design of multi-disciplinary product designs hard to grasp for designers/engineers. Prior systems just examine items as data objects that can be managed in a data base. This makes it impossible to support a creative design process required to produce a mechatronics concept design.

Disclosed embodiments work with function-based mechatronic objects and models to produce corresponding PLC code.

Mechatronic models, as used herein, can store the functional model which provides a discipline-independent definition of a system's functions which can be mapped to multiple disciplines for implementation. A function-based mechatronics object can capture and effectively reuse all data that are relevant to design the concept of a mechatronics system in one file. Such a mechatronic object can include data for 3D design including sub-assemblies, kinematics, and dynamics, logical behavior of the object including programming code, sensors and actuators to control the unit, sequence of operations (offering the capability of the "compound" operation), continuous behavior described in continuous functions, and other data as described herein. Such a mechatronics object can then be used to generate PLC code as descried herein.

A mechatronic object can include a functional decomposition that describes one or more functions of the object. For example, a functional decomposition for a gripper could include a main function of "gripper unit", and subfunctions of "move vertically" and "grip gear". The mechatronic object can be used to store functional components such as the discipline-independent aspects of the system defining what functions must be implemented by the different discipline specific models, and does not necessarily carry the details of a single specific implementation of each function.

A mechatronic object can include rough geometries or sub-assemblies for the object, and can include physics information for the object. A mechatronic object can include actuator/sensor and other information for the object. A mechatronic object can include mechanical interfaces, electrical interfaces, pneumatic interfaces, programming interfaces, and other interfaces for the object. A mechatronic object can include operations data and other information for the object.

FIG. 1 depicts a block diagram of a data processing system in which an embodiment can be implemented, including as a PDM system particularly configured to perform processes as described herein. The data processing system depicted includes a processor 102 connected to a level two cache/ bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111. Processor 102 can be implemented as means for performing functions described herein including processing, identifying, creating, generating, selecting, synthesizing, and others.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. In various embodiments, storage 126 includes the PLC code repository and the rules database described below, and can act as means for storing. I/O bus 116 can act, for example, as means for receiving.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Various embodiments include systems and methods that generate PLC code from functional PDM objects such as mechatronic objects. Disclosed embodiments can synthesize control code automatically from a 3D CAD model or other PDM object that by determining the behavior, timing, and dimensions of the system. This knowledge is used to produce the most suitable control sequences for hard real-time code that is compliant with the 3D CAD design specifications.

A 3D CAD environment generally includes a main window containing the 3D editor/visualization environment where the design parts are shown, a product tree viewer that organizes the parts in a textual and hierarchical manner, the behavior editor that allows the programmer to define functions to the parts (e.g. move, rotate), and the simulation controls that allow the behaviors to be calculated over time and the animation is shown in the 3D editor.

To synthesize PLC code from the 3D CAD system our method gathers information from the behavior editor.

Figure 2:
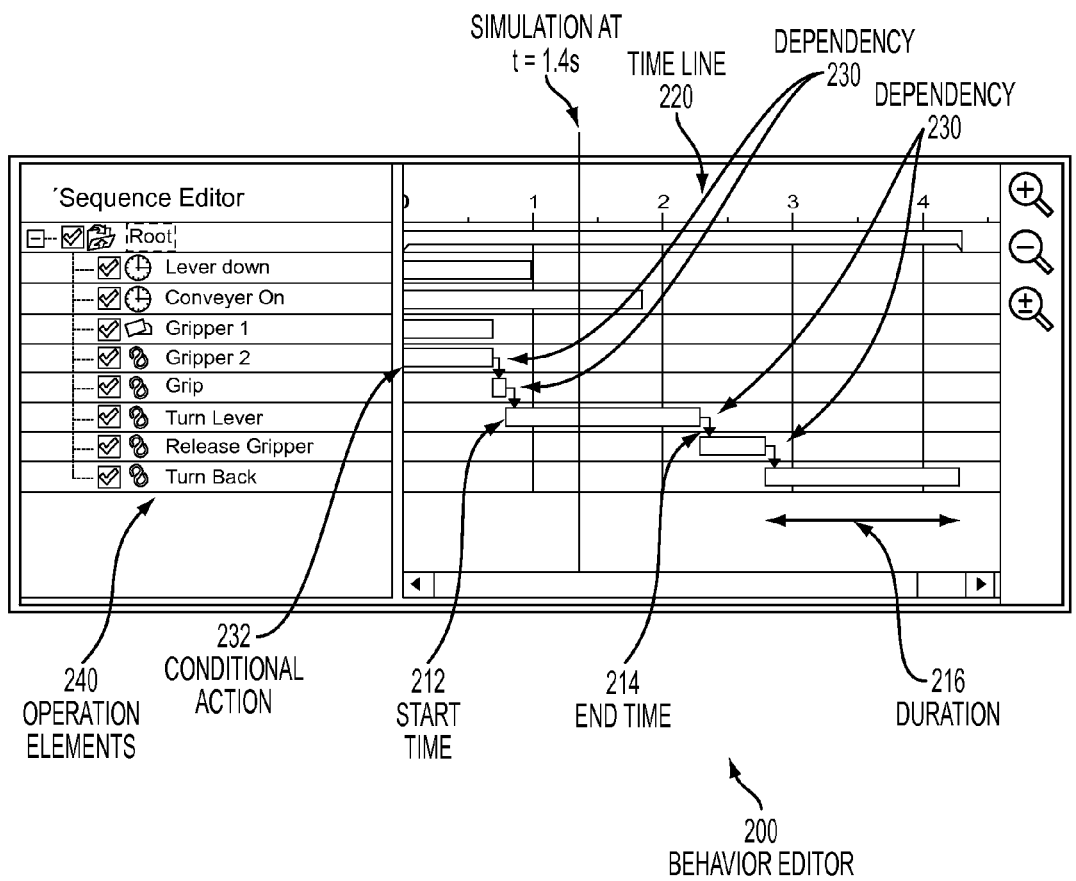
FIG. 2 shows an example of a PDM behavior editor interface for a mechatronic model in accordance with disclosed embodiment.

FIG. 2 shows an example of a PDM behavior editor interface 200 for a mechatronic model, which indicates some of the data that is stored in the mechatronic model. The behavior editor 200 contains a list of elements 240, also referred to as "operation elements", and each operation element is associated with the time line 220. Each element can correspond to or describe one or more machine actions or operations. Every element has a start time 212, an end time 214, and duration 216. These can be defined by the user. Elements can be chained through dependencies to create more complex behaviors. Other elements can be executed independently from others.

For example, the FIG. 2 shows eight elements, for lever down, conveyer on, gripper 1, gripper 2, grip, turn level, release gripper, and turn back. The first four elements are independent from each other and they all begin execution at t=0. The fifth element, grip, has a dependency from the fourth element, indicated by the arrow, and it fires if and only if the predecessor element, gripper 2, completes. A chain of dependent elements is formed from the fourth to the eight elements, as indicated by the arrows 230. The system can represent different elements by different colors; for example, the third and fourth elements (Gripper 1 and Gripper 2) can be represented by a different color, such as green, to denote a conditional element 232.

Conditional elements are triggered when all their associated conditions are met, as described in more detail below. Notice that during simulation, all the elements that are within the time step, as shown by the mark for simulation at t=1.4 seconds, are executed simultaneously. Naturally, there is concurrency in the behaviors that must be captured by the disclosed code synthesizer to create a realistic control application.

Various embodiments consider several specific items when generating the PLC code, including concurrency within elements, timing information provided by the start time, end time, and duration of elements, and whether they are conditionally executed, dependencies within elements, and context of elements, or how elements relate to physical (e.g. mechanical, electrical) phenomena.

Figure 3:
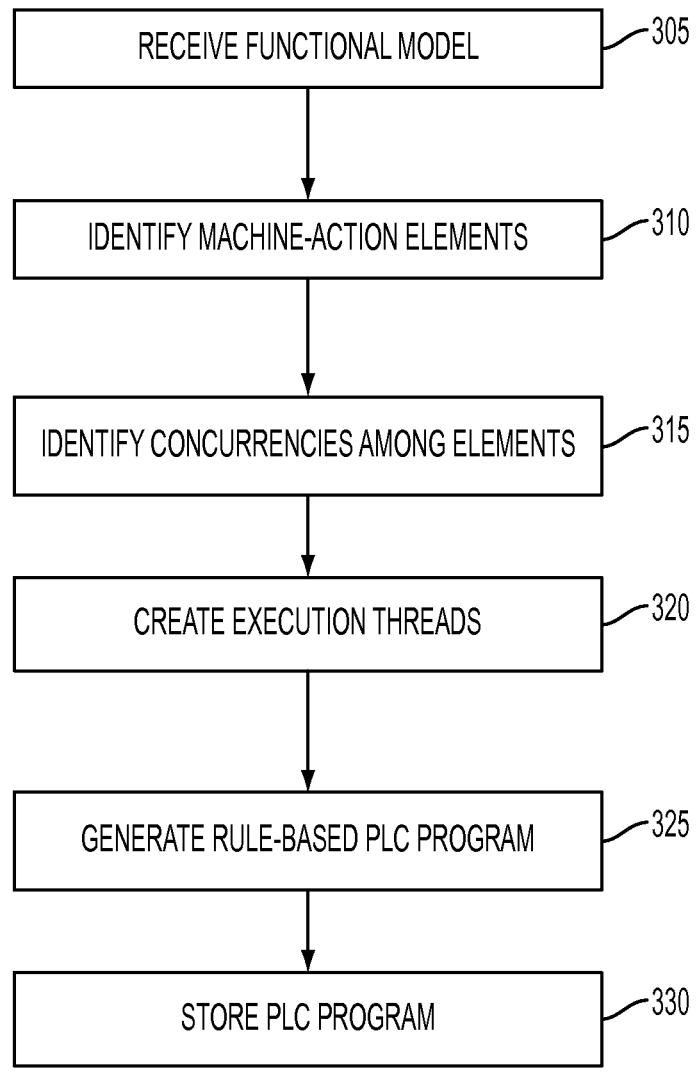
FIG. 3 depicts a flowchart of a high-level process in accordance with disclosed embodiments.

FIG. 3 depicts a flowchart of a high-level process in accordance with disclosed embodiments, and will be referred to in the following description, which will also include reference to other figures.

The system receives a functional model (step 305). The model can be, for example, a mechatronic object or model as described herein. Receiving, as used herein, can include loading from storage, receiving from another device or process, receiving via an interaction with a user, or otherwise.

The system identifies a plurality of elements in the functional model (step 310), each element corresponding to one or more machine actions. These machine-action elements define or describe functions performed by the functional model.

The system identifies concurrencies between the elements to determine at least one set of elements that each correspond to at least one machine action (step 315). The purpose of this process is to identify the parts of the PLC program to be generated that can be executed in different execution threads. This step can include analyzing the each elements, one by one, and creating sets of elements that are dependent on each other. The number of resulting sets represents the level of concurrency in the application because dependencies are contained within the set, but the sets are independent from each other and therefore can be executed concurrently.

Dependencies are explicit in the 3D CAD behavior editor and testing whether an element has dependencies is done through queries to the data structure that represents an element.

The system next creates execution threads for each of the elements in each set of machine-action elements (step 320) based on the identified concurrencies.

The system generates PLC program corresponding to the functional model, based on the execution threads (step 325). This step can include selecting the appropriate PLC code from a database of code based on rules, including rules defining physical properties and interactions.

The system stores the PLC program (step 330).

Various aspects of these processes are described in more detail below.

Figure 4:
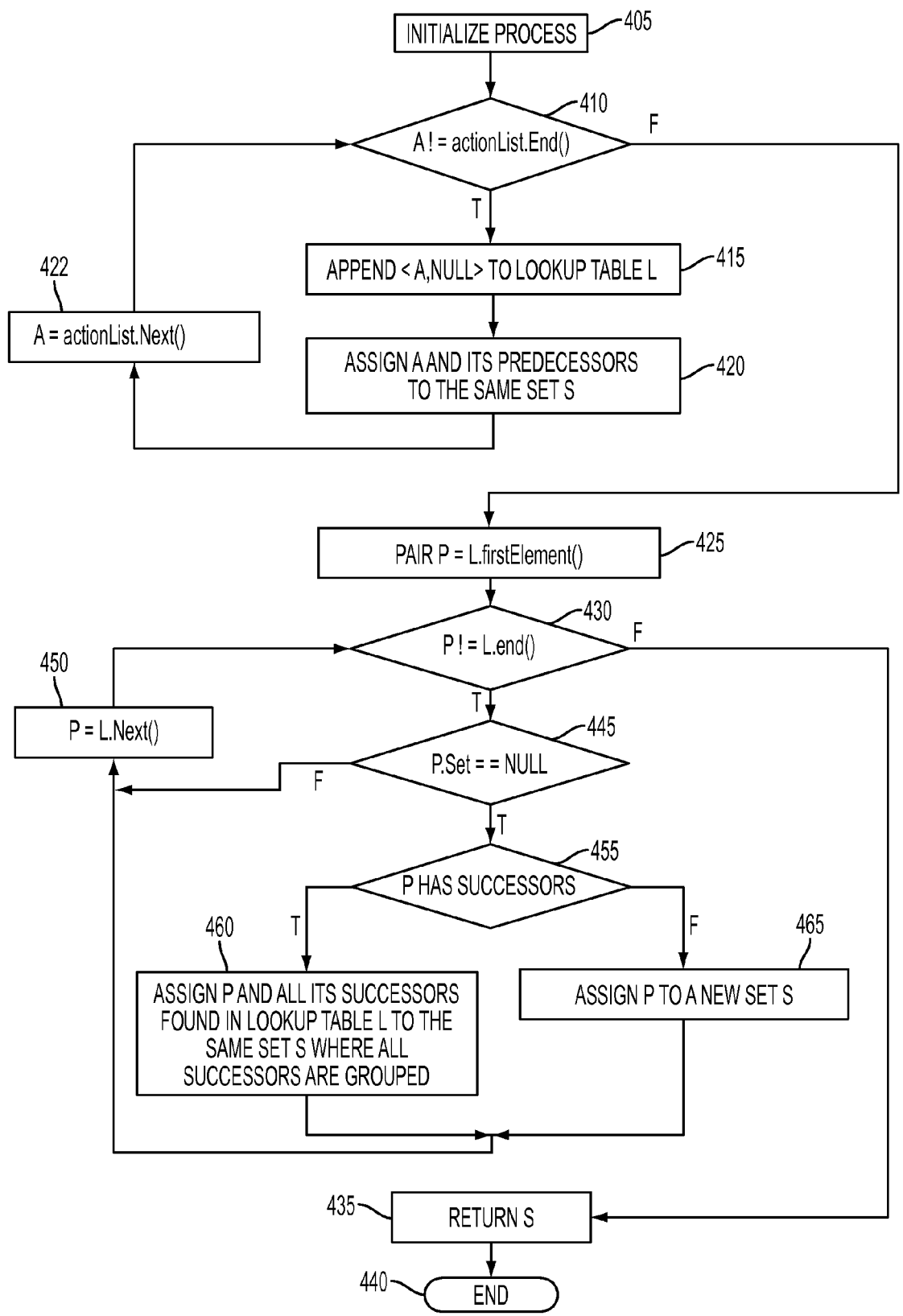
FIG. 4 depicts a flowchart of a process to identify concurrencies in accordance with disclosed embodiments.

FIG. 4 depicts a flowchart of a process to identify concurrencies, in accordance with disclosed embodiments. This process takes as input an "actionList" of the identified element, such as from a behavior editor, sorted by start time. The output of this process is a set S containing the concurrency in the program.

The system initializes by reading the identified element from the model, and can include reading the elements from a behavior editor and sorting by start time (step 405). The set S is set to null, and A is set to the actionList first element. The system can set a lookup table L of pairs of elements of the type <Action,Set> to null.

The system determines if A is unequal to the end of the actionList (step 410). Where step 410 is True so that there are unprocessed elements A in the actionList, the system appends <A,null> to the lookup table L (step 415).

The system assigns the current element A and all its predecessors found in lookup table L to the same set in S that all its predecessors are grouped (step 420). If S does not exist, then as a part of this step, the system can create a new set S. If more than one set S includes A or its predecessors, the system can merge these into a single step.

The system sets A to the next element in the actionList (step 422), and returns to step 410.

Otherwise, where step 410 is False, the system sets pair P to the first element in lookup table L (step 425).

The system determines whether P is unequal to the end of the lookup table L (step 430). If it is, so that P !=L.end( ) is False, the process is over; the system returns the set S (step 435) and ends (step 440).

Otherwise, where step 430 is True, the system determines whether the pair P.Set is null (step 445). If it is not (False) the system increments pair P to the next element in lookup table L (step 450), and returns to step 430.

If the pair P.Set is null (True) at step 445, the system determines if P has successors (step 455).

If P does have successors (True) at step 455, the system assigns P and all its successors found in lookup table L to the same set in S that all its successors are grouped (step 460), and returns to step 450.

If P does not have successors (False) at step 455, the system assigns P to a new set S (step 465), and returns to step 450.

Figure 5:
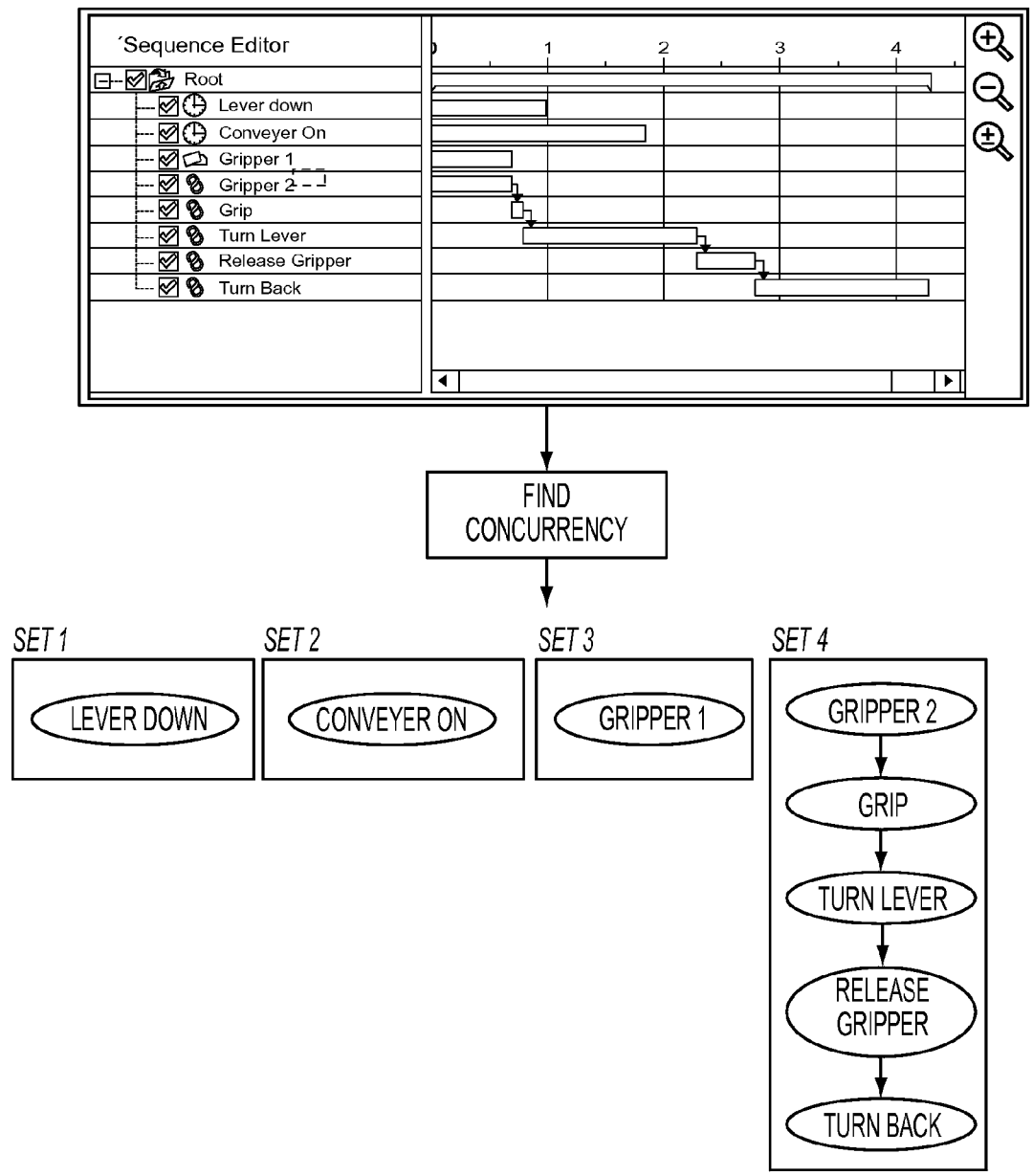
FIG. 5 illustrates an example of sets of concurrent elements found by a process in accordance with disclosed embodiments.

FIG. 5 illustrates an example of sets of concurrent elements found by such a process, using the actions illustrated in FIG. 2. As shown in this figure, Set 1 is the lever down. Set 2 is the conveyor on. Set three is gripper 1. Set 4 is gripper 2, grip, turn lever, release gripper, and turn back. As can be seen, each resulting step has an element that is performed concurrently with elements of other sets.

Figure 6:
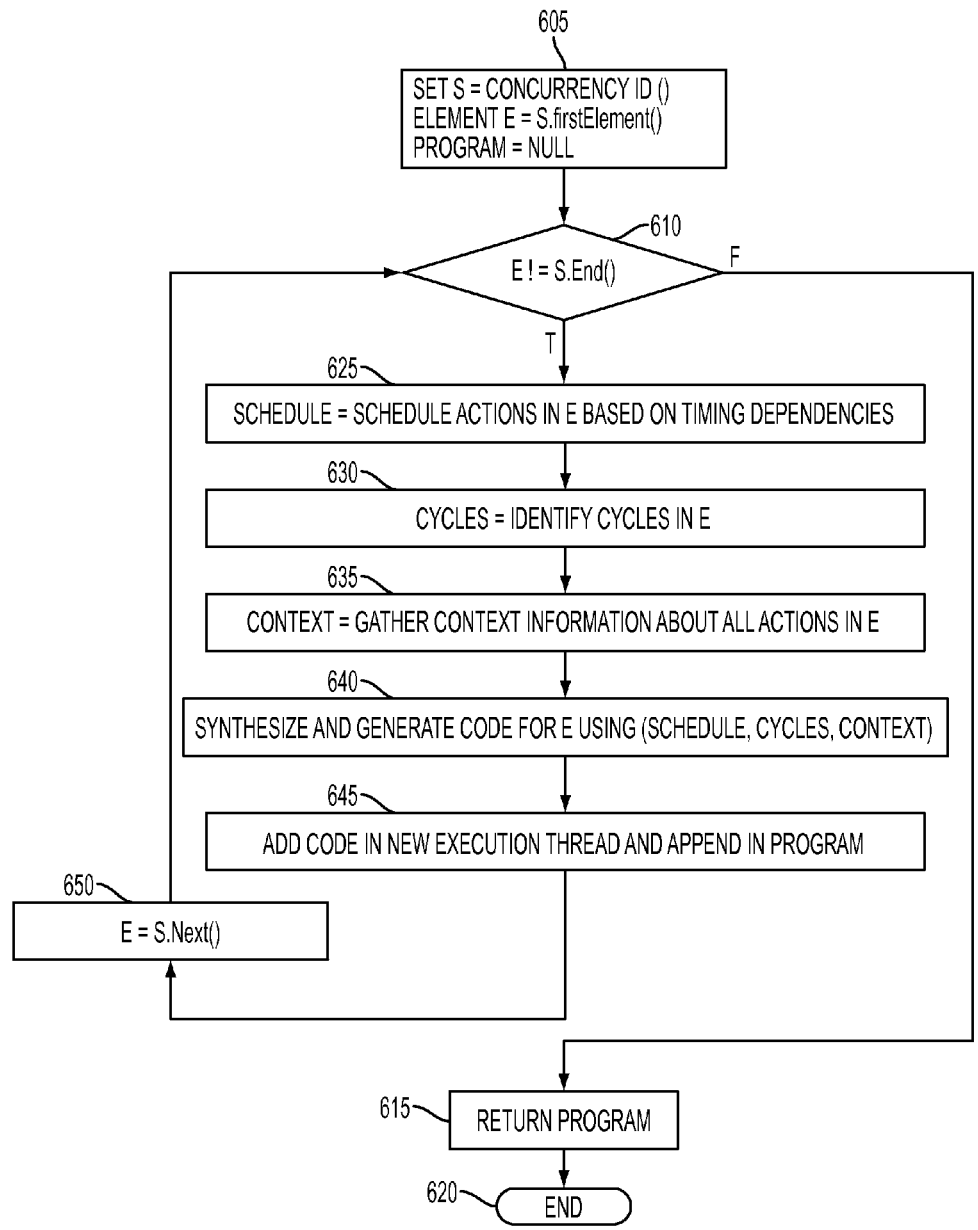
FIG. 6 depicts a flowchart of a process to create execution threads in accordance with disclosed embodiments.

FIG. 6 depicts a flowchart of a process to create execution threads, in accordance with disclosed embodiments.

The system initializes the process (step 605), by receiving as input a set S containing elements for the program, where none of the elements of the set is performed concurrently. The system sets the element E as the first element in S. The output of the process in this example is the PLC control program PROGRAM. The system initializes PROGRAM to null.

The system determines whether E is the end of the set S (step 610). If it is, so that it is False that E is unequal to the end of S, the system has completed the process, returns PROGRAM (step 615), and ends (step 620).

Otherwise, when it is True that E is unequal to the end of S, the system performs an iteration of the process.

The system identifies the schedule of the element in the set based on timing dependencies (step 625). This can be set stored as a Schedule variable, indicating the schedule for each element in S. The resulting PROGRAM should comply with timing information and data dependencies of the mechatronic model. One process for performing this step is described in more detail below.

The system identifies any cycles of the element E (step 630). A cycle is a repeating action. This can be set to a Cycles variable. This step can allow actions that are not dependent on time but rather are dependent on conditions to be scheduled.

The system identifies the context of the set (step 635), by gathering information about all actions in the element E. This can be set to a Context variable. The context information is used to derive the PROGRAM.

The system generates PLC code for the element using the identified schedule, cycles, and context (step 640). The synthesis and generation of code can be performed when the scheduling cycles, and context information has been identified. Basic code-generation techniques are known to those of skill in the art, and can be performed by commercial software packages. The system can generate code in a programming language specified by a user, such as C or IEC 61131-3, for example.

The system creates a new execution thread for the generated PLC code (step 645). This can include adding the generated PLC code to the PROGRAM. The method includes selecting the appropriate PLC code based on rules as described herein, including physical properties and interactions.

The system sets moves to the next element in the set (step 650), and returns to step 610.

For each set of elements or actions, a schedule is computed. This schedule should comply with the dependencies between elements such that are executed in the order specified by the user, and should have the same starting time and duration.

Figure 7:
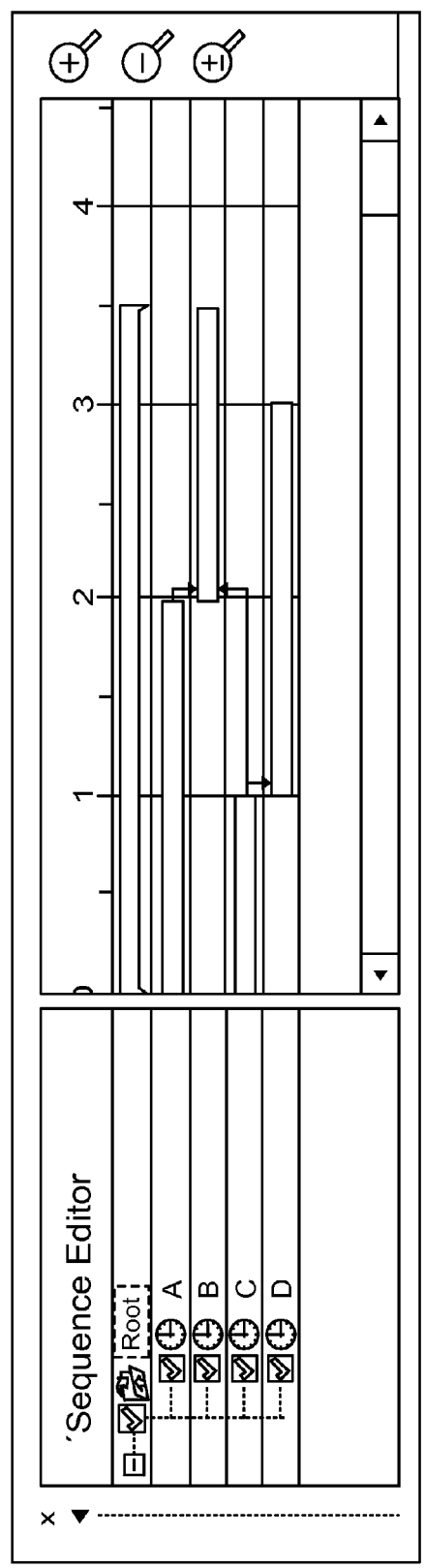
FIG. 7 illustrates an example of a set of actions for which some actions are executed concurrently.

Concurrency may exist within a set of dependent actions. FIG. 7 illustrates an example of a single Set of actions (A, B, C, D) for which from $0 \le t < 1$ s actions A and C are executed concurrently, from $1 \le t < 2$ actions A and D are executed concurrently, from 2≤t<3 actions B and D are executed concurrently, and from 3≤t<3.5 only action B is executed. The schedule can take this finer grain concurrency into account because each action may control independent and critical components of the machine under design.

The IEC 61131-3 languages, known to those of skill in the art, provide semantics for fine-grain concurrency. For example, the Simultaneous Divergence operator in Sequence Function Charts (SFC) language allows the simultaneous execution of more than one program statements, which is equivalent to a split operation in parallel computing. Synchronization operators are also provided, for example, Simultaneous Convergence operator in SFC merges divergent paths into a single path, which is equivalent to a join operation in parallel computing, and that can be used as a synchronization point for concurrency. The advantage of using these concurrency and synchronization operators built-in the language itself, rather than creating new execution threads, is that the PLC runtime system implements lightweight mechanisms for efficiently exploiting this concurrency. In addition to the semantics for concurrency, the IEC 61131-3 languages are synchronous languages and time can be explicitly encoded within the program, unlike conventional languages such as C where the concept of time does not exist. Therefore, a complete schedule can be constructed in terms of the IEC 61131-3 languages, and not in terms of additional elements like libraries, real-time operating systems, locks, semaphores, etc.

One disclosed scheduling method, that can be used as part of step 625 above, consists of building a data dependence graph G=(N, E), where N are the nodes that represent the actions in the set, and E the edges expressing the dependencies between the actions. Every node is annotated with the start time, end time, and duration. The scheduling algorithm traverses the data dependence graph G from the root nodes (nodes without predecessors are the nodes with earlier start time) in a breadth-first search such that concurrency is exposed. For all the nodes in every level in the breadth-first traversal, a schedule slot (Schedule_slot) annotation is assigned. This scheme follows an as-early-as-possible schedule.

Figure 8:
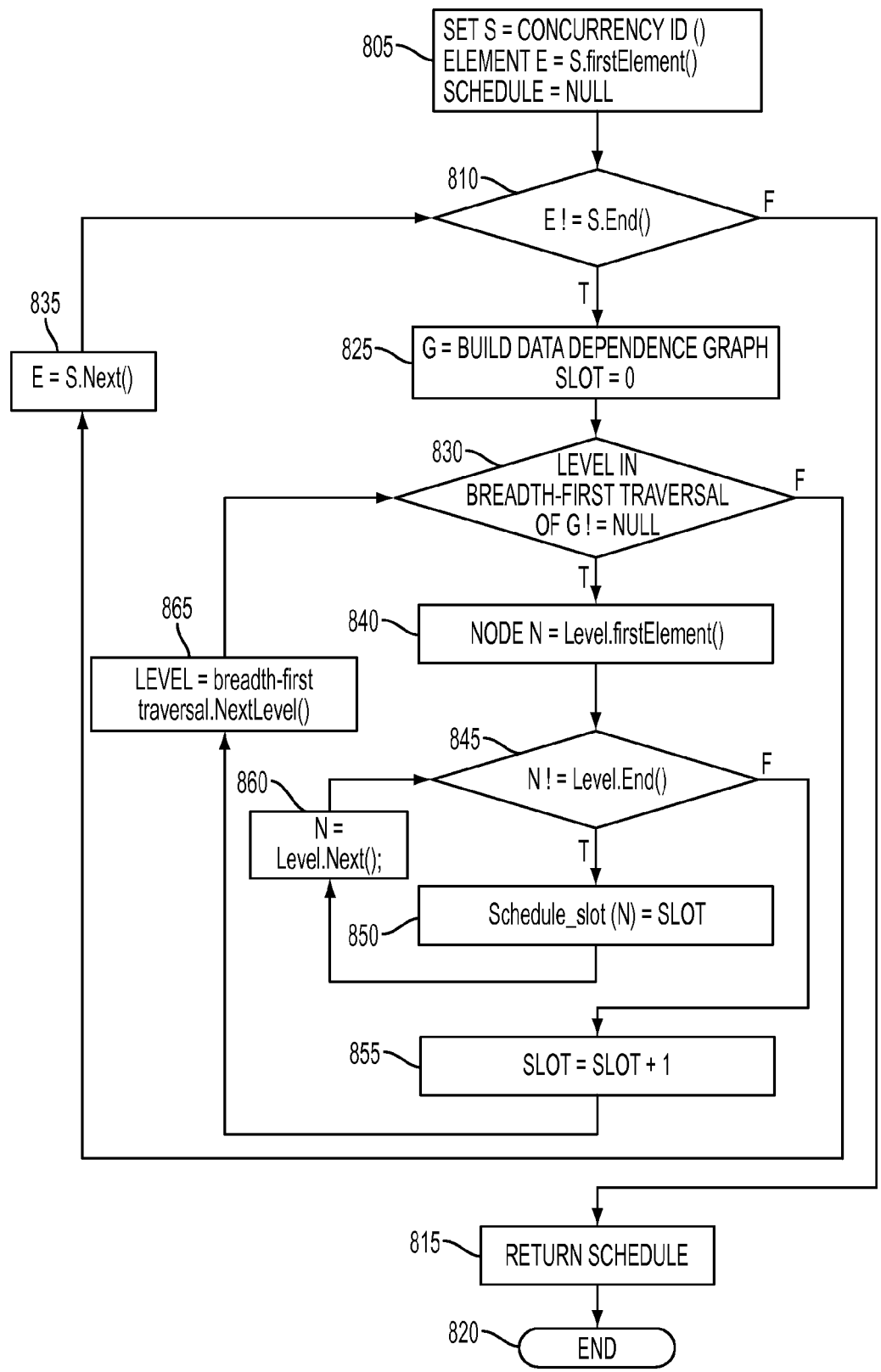
FIG. 8 shows a flowchart of a scheduling process in accordance with disclosed embodiments.

FIG. 8 shows a flowchart of a scheduling process in accordance with disclosed embodiments.

The system initializes the process (step 805), by receiving as input a set S containing the concurrency for a set of elements discussed above. The system sets the element E as the first element in S. The output of the process in this example is "Schedule", the schedule for each element in S. The system initializes Schedule to null.

The system determines whether E is the end of the set S (step 810). If it is, so that it is False that E is unequal to the end of S, the system has completed the process, returns Schedule (step 815), and ends (step 820).

Otherwise, when it is True that E is unequal to the end of S, the system builds a data dependence graph for the element (step 825), This can include setting a SLOT variable to 0.

The system determines whether there is a level to be processed in the breadth-first traversal of G (step 830). If there is not (False), the system sets E to the next element in set S (step 835) and returns to step 810.

Otherwise, the system sets node N to the level for the first element (step 840). The following steps determine the schedule slots for each action in the program to be produced.

As long as N is not at the end of the level (True at step 845), the system sets the schedule slot for node N as the current SLOT (step 850), increments the N to the next level (step 860) and returns to step 845. This loop performs the slot assignment for each node N in the level.

If N is the level end (False at step 845), then SLOT is incremented (step 855), the level is incremented to the next breadth-first level (step 865) and the system returns to step 830.

As described above, the system also determines cycles for each element. Repetitive behaviors are very common in mechatronics. For example, a paint robot in a car assembly line repeats the same actions for every chassis. What triggers these set of actions is a conditional statement, for example, a signal that indicates that a new chassis has arrived and is ready for painting. These repetitive behaviors are specified in the 3D CAD system as conditional actions. A conditional action fires whenever all its predecessors complete and all the actions contained in the subtree it dominates are not in execution state (either have never been executed or all have completed), and the conditional statements associated with it are true. The semantics of conditional action firing are:

Fire when (a) AND (b) AND (c) are true:
(a) all predecessors complete;
(b) all the actions contained in the subtree are not in execution state; and
(c) all the conditional statements associated with the action are true.

Therefore, conditional actions create cycles in the execution of parts of the program.

Figure 9:
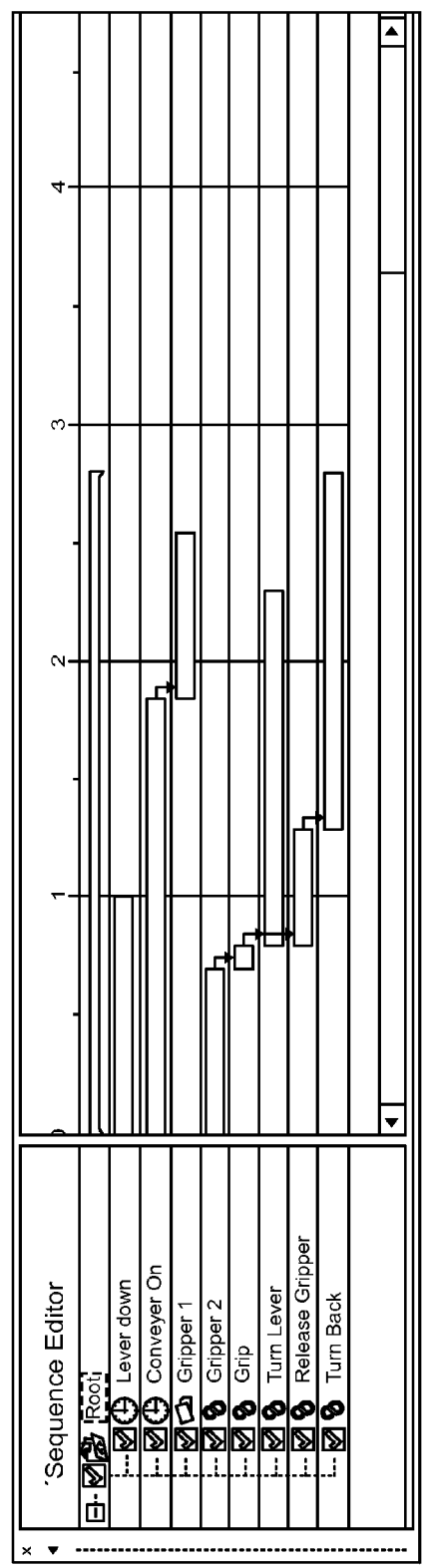
FIG. 9 shows an example of a program in accordance with disclosed embodiments.

FIG. 9 shows an example of a program with three Sets of actions. The second set is composed by the simple action "Conveyer On" and the conditional action "Gripper 1". After "Conveyer On" is executed for 1.9 seconds and completes, "Gripper 1" fires if and only if its conditional statement is true. After it completes at t=2.5, if its conditional statement becomes true again, then it fires again. Note that although "Gripper 1" has a dependency edge from "Conveyer On", after the only execution of "Conveyer On" it is marked as completed and the remaining condition for "Gripper 1" to fire is a transition from false to true in its conditional statement.

The third set composed by "Grip", "Turn Lever" ... "Turn Back" begins with the conditional action "Gripper 2". Notice that all the simple actions are dependent on the first conditional action. "Gripper 2" fires at t=0 s if and only if its conditional statement becomes true. After it completes at t=0.8 s then the rest of the actions are fired according to dataflow order. In this example, "Gripper 2" is said to dominate "Grip", "Turn Lever", "Release Gripper", and "Turn Back" because it is the parent of the subtree. This example also illustrates that if after completing all the actions in the third set, the conditional statement for "Gripper 2" becomes true then, the conditional action itself and the subtree that it dominates, is executed again (Notice that "Gripper 2" has no predecessors and therefore the only firing condition is the transition from false to true of its conditional statement). Therefore, it is important to identify the execution cycles created by the conditional actions and reflect these in the data flow graphs of the program.

Figure 10:
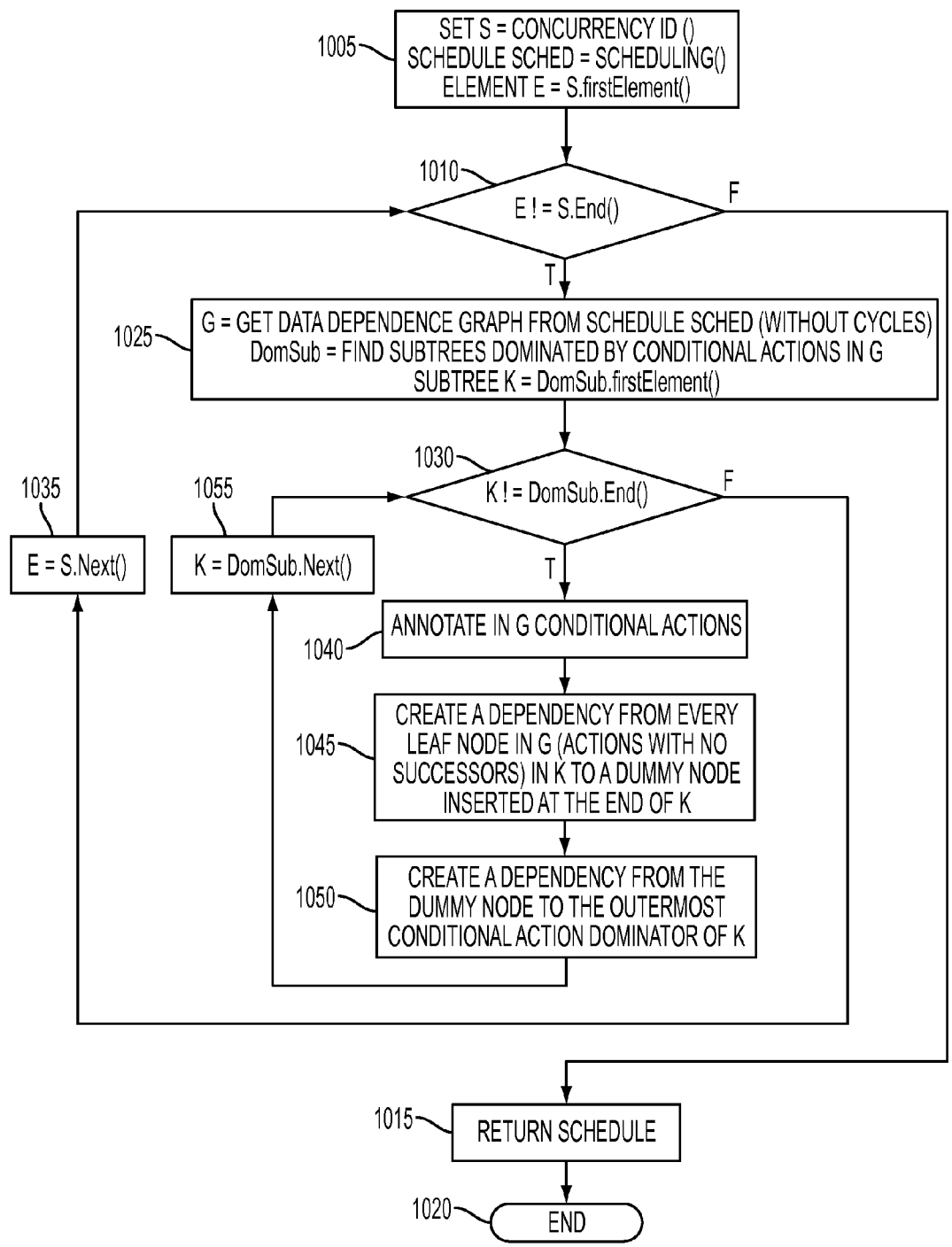
FIG. 10 shows a flowchart of a process to identify cycles in the program created by conditional actions in accordance with disclosed embodiments.

FIG. 10 shows a flowchart of a process to identify cycles in the program created by conditional actions, in accordance with disclosed embodiments, which can be used as part of step 630, above.

The system initializes the process (step 1005), by receiving as input a set S containing the concurrency for a set of elements discussed above, and the schedule without cycles, Schedule, for all elements in S. The output of the process in this example is "Schedule", the schedule for each element in S, including cycles.

The system determines whether E is the end of the set S (step 1010). If it is, so that it is False that E is unequal to the end of S, the system has completed the process, returns Schedule (step 1015), and ends (step 1020).

Otherwise, when it is True that E is unequal to the end of S, the system gets the data dependence graph G for the element from the input schedule (step 1025). This step can include determining "DomSub" by finding subtrees dominated by conditional actions in G, and defining K as the substrees in the DomSub. K can be set to the first subtree in DomSub.

The system determines whether K is the end of the Dom-Sub, meaning that the substrees have been exhausted for that element (step 1030). If it is, so that it is False that K is unequal to the end of DomSub, the system moves to the next element E in S (step 1035), and returns to step 1010.

Otherwise, the system annotates the conditional actions in G (step 1040).

The system creates a dependency from every leaf node of G in K to a dummy node inserted at the end of K (step 1045). A leaf node, in this case, is an action with no successors. This step concentrates all the dependencies of the leaf nodes in a single point references by the dummy node.

The system creates a dummy dependency from the dummy node to the outermost conditional action denominator of K (step 1050). This creates a "feedback" loop from all of the leaf nodes (concentrated at the dummy node) to the conditional action that dominates K. This feedback is useful to ensure that only a single iteration of the loop is being executed at any point of execution.

The system increments K to the next element in DomSub (step 1055), and returns to step 1030.

Figure 11:
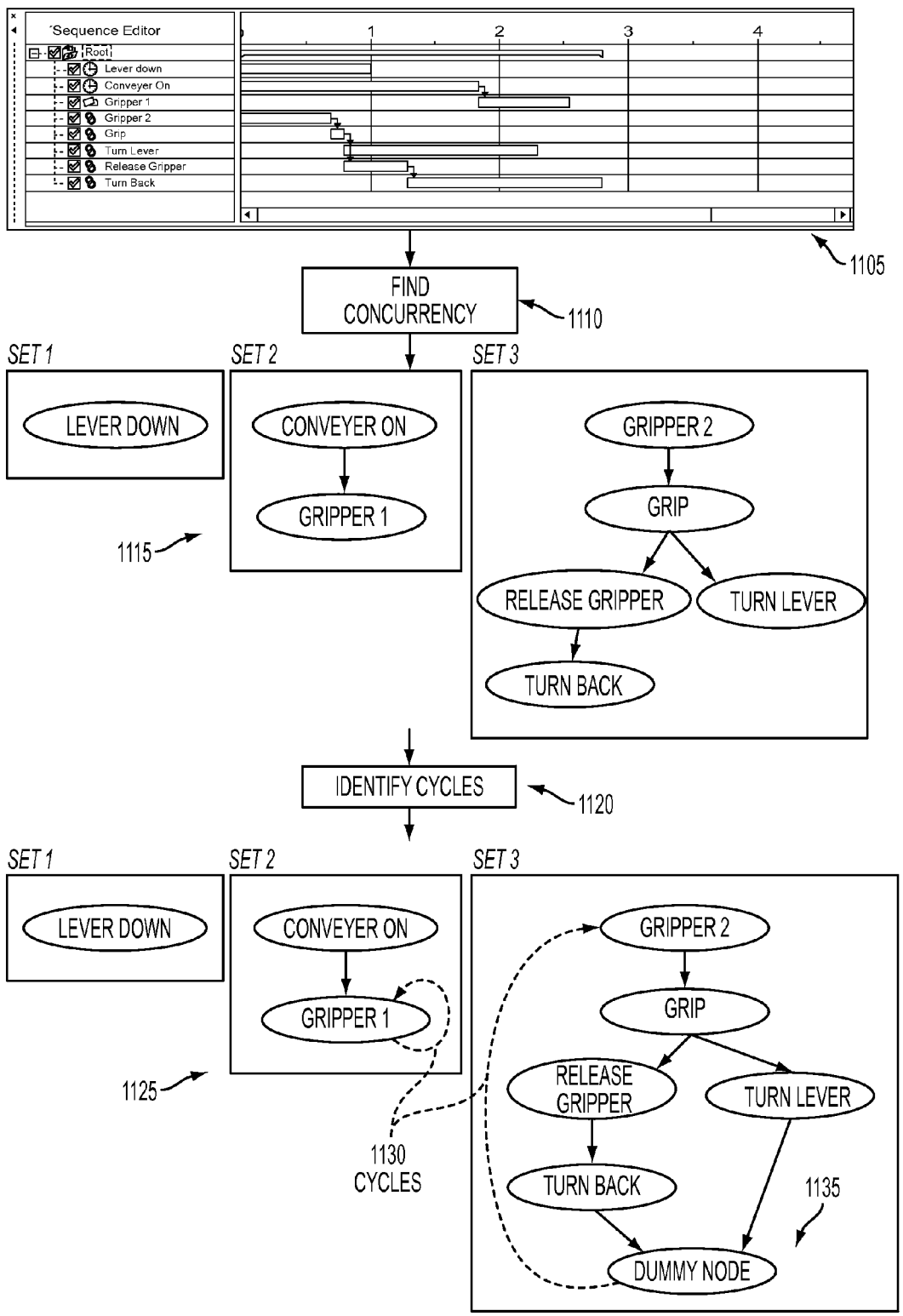
FIG. 11 shows a diagram of exemplary results of applying processes in accordance with disclosed embodiments.

FIG. 11 shows a diagram of exemplary results of applying processes as described herein.

This figure shows an example of a PDM behavior editor interface 1105 for a mechatronic model, which indicates some of the data that is stored in the mechatronic model and contains a list of elements as shown in the action editor.

The "find concurrency" process 1110 is completed, which produces sets 1115.

The "identify cycles" process 1120 is completed, which produces sets 1125 that includes the indicated cycles 1130 and dummy node 1135.

As described above, the system can determine context of an action and generate the PLC code. The context of an action refers to the type of behavior it should follow depending on its environment, type, or context. For example, the behavior of "applying a force" to a box translates into a linear velocity if the box is simply lying on a surface, and translates into a rotational velocity if the box is connected to the surface through a joint. This information is necessary for the control algorithm to correctly calculate the physical quantities.

A PDM system as described herein can receive user-specified commands within an action. Every action can have a reference to a physics object in the 3D CAD system. In one example, the action references a robotic arm. The user can specify, such as by checking boxes, that the target "position" is 45.00 degrees, and that the control program should calculate the "speed" accurately. The user also provides the duration of the task. In combination, the context of this action can be interpreted as follows: "move the robotic arm from current position to a target position of 45.0 degrees in 1.5 seconds".

From physics laws, we know that linear velocity is calculated with the formula $$LinearVelocity = \frac{\Delta position}{time}$$

Therefore, the control code that calculates the speed should be:

$$Speed = \frac{(position - current\ position)}{time}$$

Where the position is the user specified constant, the current position is the actual position of the object, and time is the user-specified time-bounds to complete the action.

Notice that the synthesis of control code from 3D CAD models can include inferring the user's intentions from the available information. These constraints should be solved into concrete equations by the synthesizer to identify the proper sequences of code (given by known formulas from physics, mechanics, electricity, magnetism, etc) to produce correct control code.

The synthesizer receives the inferred context as an input together with a rules database where the mathematical descriptions of behavior (e.g. motion, thermal, flows, etc) are described. Given the known variables and the given context, the synthesizer identifies the rules that are to be used to generate proper control code.

Figure 12:
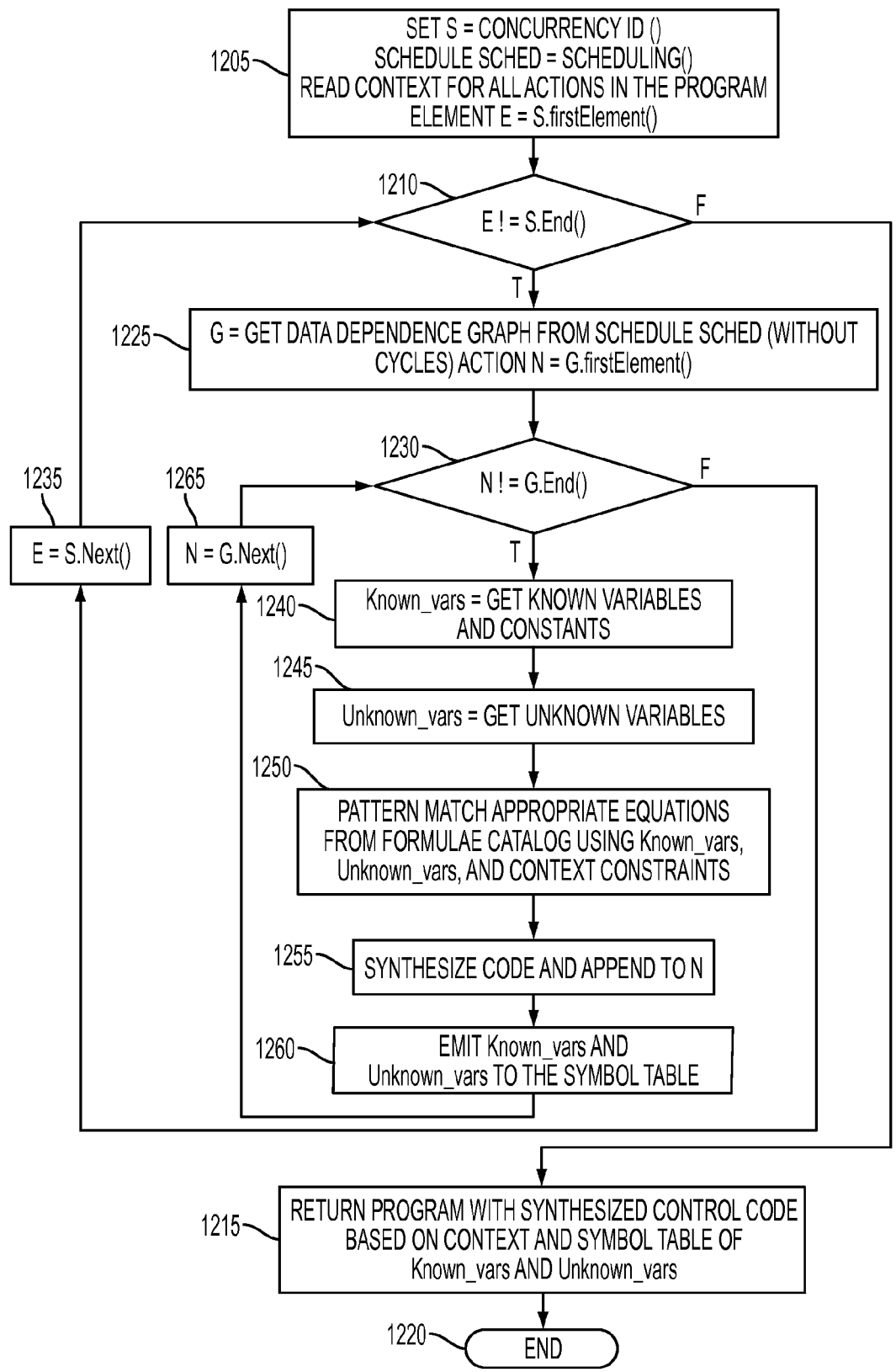
FIG. 12 shows a flowchart of a process to for rule-based code generation in accordance with disclosed embodiments.

FIG. 12 shows a flowchart of a process for rule-based code generation in accordance with disclosed embodiments, which can be used as part of step 640, above.

The system initializes the process (step 1205), by receiving as input a set S containing the concurrency for a set of elements discussed above, the schedule, Schedule, for all elements in S, and the context for all actions in the program. The output of the process in this example is a PLC program with synthesized control code based on context and a symbol table of known_vars and unknown_vars (inputs/outputs).

The system determines whether E is the end of the set S (step 1210). If it is, so that it is False that E is unequal to the end of S, the system has completed the process, returns a PLC program with synthesized control code based on context and a symbol table of known_vars and unknown_vars (inputs/outputs) (step 1215), and ends (step 1220). The PLC program is synthesized from the selected PLC code, described below, which is combined from the nodes N into the PLC program.

Otherwise, when it is True that E is unequal to the end of S, the system gets the data dependence graph G for the element from the input schedule (step 1225). This step can include setting action N as the first element in G. The system can use the dependence graph without cycles since the conditional actions are identified by annotations in the data dependence graph.

The system determine if N is unequal to the end of G (Step 1230). If this is False, so N is at the end of G, the system moves to the next element E in S (step 1235) and repeats to step 1210.

Otherwise, where it is True that N is not the end of G, the system gets the known variables and constants and stores these as known_vars (step 1240).

The system gets the unknown variables and stores these as unknown_vars (step 1245).

The system applies rules from the rules database to match rules using known_vars, unknown_vars, and context constraints (step 1250). This can be performed by pattern matching. This step selects the proper control code from a code repository, based on the rules, for the code generation.

The system generates PLC code and appends the code to action N (step 1255). This can be performed by combining the selected PLC code to append to action N.

The system stores the known_vars and unknown_vars in a symbol table (step 1260).

The system increments N to the next element in G (step 1265), and repeats to 1230.

The resulting PLC program can be generated in Sequential Function Charts (SFC) where the main features related to concurrency, timing, synthesized code, and cycle execution are highlighted.

FIG. 13 shows the resulting symbol table for an exemplary synthesized control program in accordance with disclosed embodiments. Notice that variables are classified as Input, Output, and Local. Input variables are the known variables, the Output variables are the unknown variables that are computed by the synthesized control code, and Local variables are temporary variables used to compute the outputs and to validate the control flow in computation cycles introduced by conditional actions. Variables can be of any type (real, boolean, integer, etc) and an Initial Value is provided to initialize the controller.

Figure 14:
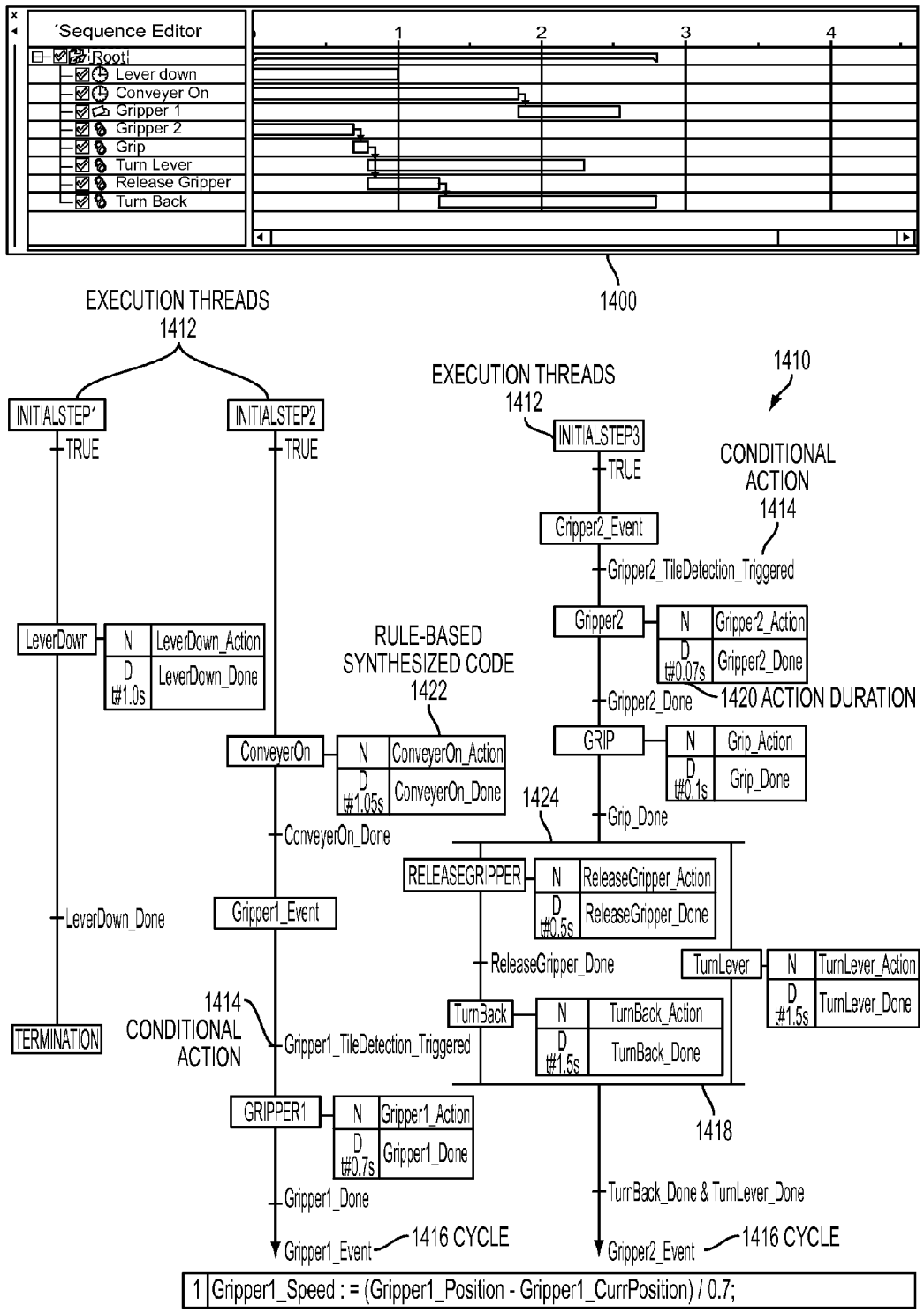
FIG. 14 shows the resulting exemplary PLC control code for an exemplary control program in accordance with disclosed embodiments.

FIG. 14 shows the resulting exemplary PLC control code for an exemplary control program in accordance with disclosed embodiments, corresponding to the examples given above, SFC form. The mechatronic operations shown at 1400 are used to generate the rule-based PLC program in SFC form shown at 1410.

This figure includes execution threads 1412 for independent sets of actions. In this example, the concurrency is three, with three execution threads 1412. This figure shows an example of a conditional action 1414 and cycles 1416. An example of fine-grain concurrency synchronization through simultaneous convergence operators is shown at 1418. An example of fine-grain concurrency through simultaneous divergence operators is shown at 1424. An example of rule-based synthesized code is shown at 1422. Action duration is shown at 1420.

The synthesis of control applications from 3D CAD models as disclosed herein allows the control applications to be derived directly from the designer's intentions, and not from a separate and independent development stage. The synthesized code deployed in the actual controller can be tested through a software-in-the-loop or a hardware-in-the-loop simulation with the 3D CAD environment. The symbol table generated by the code generation process provides the interface for the control application to communicate with the 3D CAD runtime environment.

In existing 3D CAD systems, the controller program is emulated within the 3D CAD software. This has the disadvantage that the emulated program is not executed in real-time and therefore its behavior cannot be used for validation and verification. In contrast, disclosed embodiments enable co-simulation by synthesizing actual control code from the 3D CAD environment that can be directly executed in real controllers. The code is synthesized in such a way that can be interfaced with an instance of the 3D CAD system for co-simulation. Using systems and methods as disclosed herein, the user can select whether the controller code is emulated or executed in the real controller. More importantly, various disclosed embodiments provide a truly integrated approach to developing mechatronic systems in a single step.

Disclosed embodiments provide distinct technical advantages. According to various embodiments, PLC control code can be automatically synthesized from the 3D CAD or PDM specification or models. Generating PLC code facilitates the compliance with hard real-time requirements because the PLC hardware itself guarantees the deadlines. PLC control code is regulated by the IEC 61131-3 standard, hereby incorporated by reference, and it includes the semantics commonly used in control applications. Disclosed embodiments provide tight integration between the 3D CAD and the control software development. Traceability between the control code and the PDM model, as disclosed herein, facilitates the testing and validation of the control code and the mechatronic system. The ability to execute the PLC code in a co-simulation environment with the PDM model allows detailed timing analysis of control signals. Similarly, the behavior in the PDM object can be validated when executed with a co-simulation of the control software (either executed in the real PLC or in a simulated PLC).

Unless otherwise described, the various processes, actions, and steps described above can be performed concurrently, sequentially, in a different order, omitted in various embodiments, or can be combined in other embodiments.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a product data management (PDM) data processing system, comprising:
   receiving a functional model;
   identifying a plurality of elements of the functional model, by the PDM data processing system, each element corresponding to one or more machine operations;
   identifying concurrencies between elements, by the PDM data processing system, to determine a plurality of sets of elements, each set of elements including elements that are dependent on each other and each set being independent of each other set;

creating an execution thread for each of the sets of elements, by the PDM data processing system, based on the identified concurrencies; and generating a programmable logic controller (PLC) program corresponding to the functional model, based on the execution threads.

2. The method of claim 1, wherein the PDM data processing system applies rules from a rules database to select PLC code from a code repository.

3. The method of claim 2, wherein the PLC program is synthesized from the selected PLC code.

4. The method of claim 1, wherein the PDM data processing system also creates a symbol table that includes known and unknown variables.

5. The method of claim 1, wherein the PDM data processing system also identifies cycles in each set of elements.

6. The method of claim 1, wherein the PDM data processing system also produces a schedule for each element.

7. The method of claim 1, wherein the PDM data processing system also identifies the context of the at least one set of elements.

8. A product data management (PDM) data processing system, comprising:
at least one processor; and
an accessible memory, wherein the PDM data processing system is configured to:
receive a functional model;
identify a plurality of elements of the functional model, each element corresponding to one or more machine operations;
identify concurrencies between elements to determine a plurality of sets of elements, each set of elements including elements that are dependent on each other and each set being independent of each other set;
create an execution thread for each of the sets of elements; based on the identified concurrencies, and
generate a programmable logic controller (PLC) program corresponding to the functional model, based on the execution threads.

9. The PDM data processing system of claim 8, wherein the PDM data processing system applies rules from a rules database to select PLC code from a code repository.

10. The PDM data processing system of claim 9, wherein the PLC program is synthesized from the selected PLC code.

11. The PDM data processing system of claim 8, wherein the PDM data processing system also creates a symbol table that includes known and unknown variables.

12. The PDM data processing system of claim 8, wherein the PDM data processing system also identifies cycles in each set of elements.

13. The PDM data processing system of claim 8, wherein the PDM data processing system also produces a schedule for each element.

14. The PDM data processing system of claim 8, wherein the PDM data processing system also identifies the context of the at least one set of elements.

15. A non-transitory computer-readable medium encoded with executable instructions that, when executed, cause a product data management (PDM) data processing system to:
receive a functional model;
identify a plurality of elements of the functional model, each element corresponding to one or more machine models;
identify concurrencies between elements to determine a plurality of sets of elements, each set of elements including elements that are dependent on each other and each set being independent of each other set;
create an execution thread for each of the sets of elements, based on the identified concurrencies; and
generate a programmable logic controller (PLC) program corresponding to the functional model, based on the execution threads.

16. The computer-readable medium of claim 15, wherein the PDM data processing system applies rules from a rules database to select PLC code from a code repository.

17. The computer-readable medium of claim 16, wherein the PLC program is synthesized from the selected PLC code.

18. The computer-readable medium of claim 15, wherein the PDM data processing system also creates a symbol table that includes known and unknown variables.

19. A product data management (PDM) data processing system, comprising:
means for receiving a functional model;
means for identifying a plurality of elements of the functional model, each element corresponding to one or more machine operations;
means for identifying concurrencies between elements to determine a plurality of sets of elements, each set of elements including elements that are dependent on each other and each set being independent of each other set;
means for creating an execution thread for each of the sets of elements, based on the identified concurrencies; and
means for generating a programmable logic controller (PLC) program corresponding to the functional model, based on the execution threads.

20. The PDM data processing system of claim 19, wherein the PDM data processing system applies rules from a rules database to select PLC code from a code repository, and wherein the PLC program is synthesized from the selected PLC code.

* * * * *